United States Patent [19]

Jacobson

[11] Patent Number: 5,273,435
[45] Date of Patent: Dec. 28, 1993

[54] TUMOR LOCALIZATION PHANTOM

[75] Inventor: Donald R. Jacobson, Waukesha, Wis.

[73] Assignee: The MCW Research Foundation, Inc., Milwaukee, Wis.

[21] Appl. No.: 915,473

[22] Filed: Jul. 16, 1992

[51] Int. Cl.$^5$ ............................................. G09B 23/30
[52] U.S. Cl. ........................................ 434/267; 434/262; 623/7
[58] Field of Search ............... 434/267, 273, 272, 262; 623/7, 8

[56] References Cited

U.S. PATENT DOCUMENTS

| | | |
|---|---|---|
| 2,124,767 | 7/1938 | Dawn . |
| 4,001,951 | 1/1977 | Fasse ............................ 434/267 |
| 4,126,789 | 11/1978 | Vogl et al. ..................... 250/505 |
| 4,134,218 | 1/1979 | Adams et al. ................. 434/267 |
| 4,655,716 | 4/1987 | Hoevel .......................... 434/267 |
| 4,867,686 | 9/1989 | Goldstein ...................... 434/267 |
| 5,053,341 | 10/1991 | Companion ..................... 436/8 |
| 5,125,408 | 6/1992 | Basser ........................... 128/653.2 |

FOREIGN PATENT DOCUMENTS

| | | | |
|---|---|---|---|
| 1262562 | 10/1986 | U.S.S.R. ........................ 434/262 |
| 2241815 | 9/1991 | United Kingdom ............ 434/267 |

Primary Examiner—Gene Mancene
Assistant Examiner—L. Thomas
Attorney, Agent, or Firm—Quarles & Brady

[57] ABSTRACT

A phantom for use in training persons in locating and aspirating tumors identified by X-ray in a human body part consists of a body of a tissue equivalent X-ray permeable material containing at least one aspiratable simulated tumor suspended in the interior of the body. A method of making the phantom also is disclosed.

8 Claims, 1 Drawing Sheet

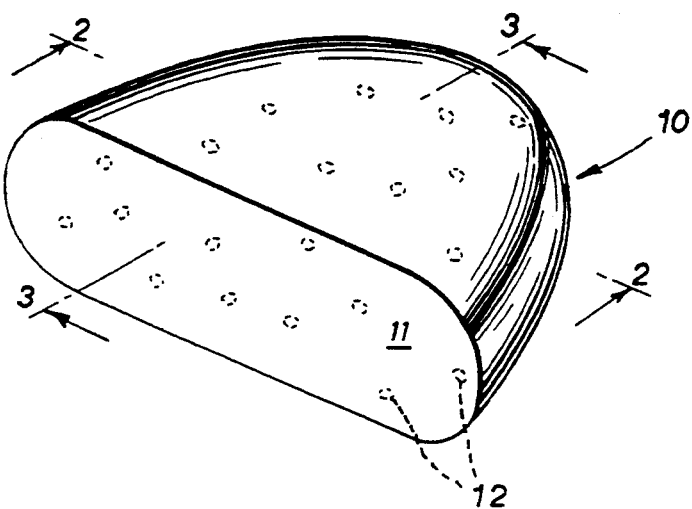
FIG. 1
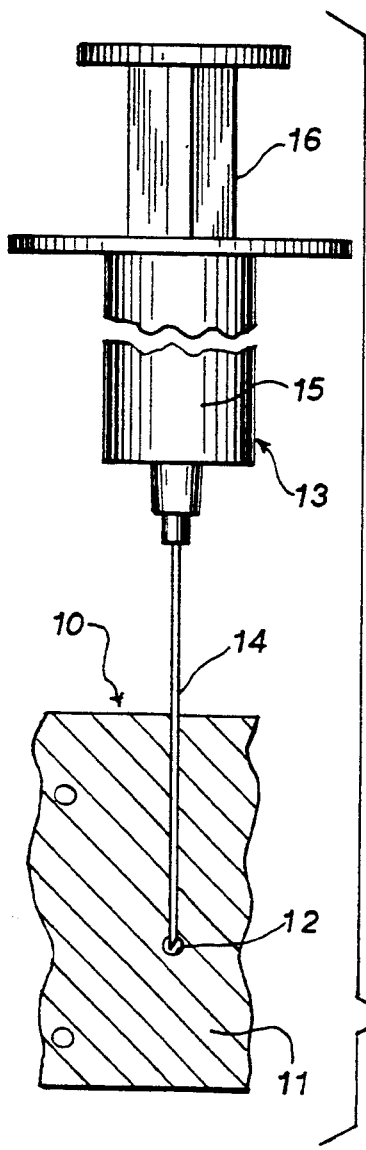
FIG. 4
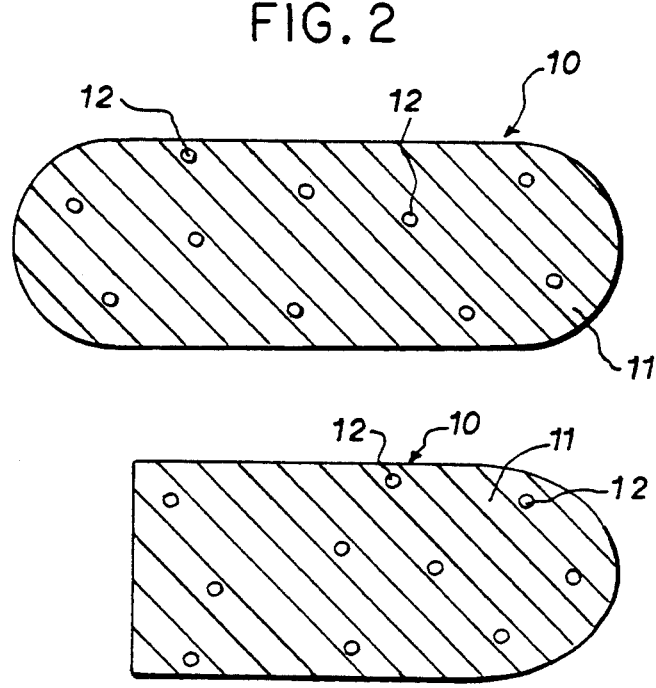
FIG. 2
FIG. 3

TUMOR LOCALIZATION PHANTOM

FIELD OF THE INVENTION

The present invention relates to X-ray phantoms. More particularly, it relates to a X-ray phantom which is useful in training persons to locate and to aspirate tumors.

BACKGROUND OF THE INVENTION

The use of X-rays to detect and locate tumors, which differ in X-ray attenuation from the surrounding background tissue, in the human body is well established. One of the most widely used of such X-ray uses is mammography.

Mammography is now accepted as a valuable procedure for the early detection of breast cancer. Once a potential tumor is identified by X-ray, a sample of the tumor is normally aspirated with an aspiration syringe and evaluated to see if it is benign or malignant. The aspiration of a potential tumor, especially a tiny tumor, in mammary tissue which has been compressed as is required in mammography can be a difficult task because it requires accurately piercing the wall of the tumor which is located beneath the skin within the mammary tissue with the needle of the aspiration syringe.

A variety of automated systems for stereotactic localization of breast tumors and automated needle placement into the suspected region have become available. This situation has created the need for a breast equivalent phantom which can be used for operator training, practice and to verify the proper operation of the system.

Unfortunately, there has not been a good model or phantom available upon which to practice the skills required to accurately locate and aspirate a tumor in soft tissue and which can be used to verify the proper operation of a computerized stereotactic localization apparatus.

BRIEF SUMMARY OF THE INVENTION

It is an object of the present invention to disclose a novel X-ray phantom which can be both used to practice locating and aspirating a tumor found in soft tissue by an X-ray procedure, such as mammography, and to verify the proper operation of computerized stereotactic localization apparatus.

The X-ray phantom of the present invention comprises a body of an X-ray permeable, tissue equivalent material which contains at least one aspiratable simulated tumor.

In a preferred embodiment of the invention, the X-ray phantom is a body of gelatin which is cast in the form of a human breast compressed as occurs during mammography. The body contains at least one simulated tumor of iodinated oil, which is radiopaque and also contains a visible dye, which is suspended in the interior of the body.

The method of the present invention can be practiced by first locating a simulated tumor in the phantom by use of stereo X-ray views and inputting the coordinates of the tumor into a computer. The computer calculates the location of the tumor and specifies the location of the needle placement. The needle of the aspiration syringe is then inserted through the body of the phantom and into the simulated tumor, the contents of the simulated tumor are then aspirated into the syringe by pulling back upon the syringe plunger. The preferred X-ray phantom contains up to 20 or more of the simulated tumors so that the procedure can be practiced until the technique is perfected.

The previously mentioned and other objects and advantages of the invention will be apparent from the description of the preferred embodiment and the drawings.

BRIEF DESCRIPTION OF THE DRAWINGS

In the drawings:

FIG. 1 is an elevational view of one embodiment of the phantom of the present invention;

FIG. 2 is a view taken along line 2—2 in FIG. 1;

FIG. 3 is a view taken along line 3—3 in FIG. 1; and

FIG. 4 is a schematic view showing the aspiration of a simulated tumor.

DESCRIPTION OF THE PREFERRED EMBODIMENT

In the preferred embodiment of the invention seen in FIGS. 1 to 3, the phantom is a body 10 of x-ray permeable tissue equivalent, solidified, gelatin 11 having the shape of a compressed human breast. As seen best in FIGS. 2, 3 and 4, a plurality of simulated tumors 12 are suspended in the gelatin 11. The simulated tumors 12 are pockets formed in the gelatin containing small amounts of a radiopaque material, such as iodinated oil containing lampblack. The body 10 of solidified gelatin can be handled without distortion and it is preferrably stored prior to use in a plastic bag to prevent it from becoming dehydrated.

As seen in FIG. 4, a simulated tumor 12 can be aspirated with an aspiration syringe 13 by inserting the needle 14 of the syringe 13 through the gelatin 11 and into the simulated tumor 12. The contents of the tumor 12 are then aspirated into the barrel 15 of the syringe 13 by pulling back on the plunger 16.

The phantom 10 of FIG. 1 can be prepared by casting in a mold of the desired shape a liquid form of a suitable X-ray permeable, tissue equivalent material, such as animal hide gelatin, which will solidify to form a phantom of the desired properties. When the liquid in the mold is partially solidified, small amounts of a radiopaque material, such as iodinated oil containing a colorative, such as lampblack, are injected into pockets formed within the interior of the liquid. As the liquid solidifies the radiopaque material is trapped within the body to create the simulated tumors 12.

A particularly useful phantom for mammography is formed by pouring a solution of 25 grams of animal hide gelatin in 100 grams of water in a mold in the shape of a 4-½ inch compressed human breast which is about 20 cm wide, about 10 cm long and about 45 mm high. During the solidification of the gel up to 20 simulated tumors (about 2 mm×2 mm×2 mm) are formed by injecting small amounts of iodinated oil containing lampblack with a needle into cavities within the gel filled with the iodinated oil. The resulting phantom which forms when the gel solution solidifies is a good representation of average tissue having properties between adipose and gland tissue. A needle can be easily passed through the gel toward the simulated tumor.

The phantom of the present invention is very useful for practicing the procedure of locating and aspirating tumors in mammary tissue and verifying the proper operation of computerized stereotactic localization apparatus because the X-ray permeability, texture and penetrability of the solidified gel is very similar to that of normal mammary tissue.

When used to verify the operation of a stereotactic localization apparatus, the phantom is placed on the breast support of the apparatus, and a compression paddle is brought into place (for systems designed to work with pendulent breasts, the phantom can be conveniently held in the device by the compression paddle). The phantom is positioned so that the target of interest is within the working volume of the stereotactic apparatus. The phantom is then imaged using the same stereo procedure as would be used with a breast. The simulated tumor target of interest is identified and marked in both images, and if the stereo localization is functioning properly, the needle when inserted will be guided just to the tip or to the center of the simulated tumor based upon the algorithm used in the apparatus. If the needle is properly placed into the simulated tumor, the liquid iodinated oil and colorant can be aspirated into the biopsy needle. The colorant can then be detected by transferring the needle contents to a towel or a vial. Each simulated tumor can be used once. When all the simulated tumors have been aspirated, the phantom is discarded.

It will be readily apparent to those skilled in the art that the foregoing drawing and description has been for purposes of illustrations and that a number of changes and modifications can be made without departing from the spirit and scope of the invention. For example, the phantoms can be made in the shape of other body parts from the described and equivalent X-ray permeable materials. In addition, other radiopaque materials can be used to prepare the simulated tumors. Therefore, it is intended that the application only be limited by the claims.

I claim:

1. A phantom for use in training persons in locating and aspirating tumors identified by X-ray in a human body part, said phantom comprising a body of tissue equivalent, X-ray permeable material in the shape of said body part, said body containing at least one simulated tumor suspended within the interior of said body; said tumor containing therein a radiopaque material which can be aspirated therefrom through a needle of a syringe which needle has been passed from the outside through the X-ray permeable material into the simulated tumor.

2. A phantom of claim 1 in which body is cast in the shape of a compressed human breast.

3. A phantom of claim 1 in which X-ray permeable material is gelatin.

4. A phantom of claim 1 in which the radiopaque material is iodinated oil.

5. A phantom of claim 4 in which the iodinated oil contains lampblack.

6. A method of making an X-ray phantom for use in training persons to locate and aspirate tumors in a human breast, said method comprising:
 (a) casting a liquid X-ray permeable material into a mold having the shape of a human breast;
 (b) injecting and suspending within the liquid material at least one simulated tumor containing a radiopaque material which can be aspirated therefrom through a needle of a syringe; and
 (c) solidifying said liquid to form a body that simulates human tissue.

7. A method of claim 6 in which the X-ray permeable material is gelatin.

8. A method of claim 6 in which the radiopaque material is iodinated oil.

* * * * *

REEXAMINATION CERTIFICATE (2749th)
United States Patent [19]
Jacobson

[11] B1 5,273,435
[45] Certificate Issued Dec. 5, 1995

[54] TUMOR LOCALIZATION PHANTOM

[75] Inventor: Donald R. Jacobson, Waukesha, Wis.

[73] Assignee: The Medical College of Wisconsin, Inc., Milwaukee, Wis.

Reexamination Request:
No. 90/003,460, Jun. 14, 1994

Reexamination Certificate for:
Patent No.: 5,273,435
Issued: Dec. 28, 1993
Appl. No.: 915,473
Filed: Jul. 16, 1992

[51] Int. Cl.6 .................................................. G09B 23/30
[52] U.S. Cl. ............................ 434/267; 434/262; 623/7
[58] Field of Search .................................... 434/267, 273, 434/272, 262; 623/7, 8

[56] References Cited

PUBLICATIONS

*Robotics in Service*, by J. F. Engleberger; Chapter 7, pp. 130–133: 1989; Kogan Page LTD.
Article entitled: "Biopsy by needle puncture and aspiration". *Ann. Surg.*, 92:169–181, by Martin H E and Ellis E B. 1930.
Article entitled: "Phantom for Use in Lung Biopsy Training" by William W. Scott, Jr., M.D., and Janet E. Kuhlman, M. D. in *Radiology* magazine, p. 286, Jul. 1992, distributed Jun., 1992.
Technical Note entitled: "A Simple Phantom for Training in Ultrasound-guided Needle Biopsy Using the Freehand Technique" by Bruno D. Fornage, M.D. published by *American Institute of Ultrasound in Medicine . J Ultrasound Med* 8:701–703, 1989. 0278–4297.
Technical Note entitled: "A Simple Phantom for Learning Needle Placement for Sonographically Guided Biopsy" by Bruce Silver, Ted S. Metzger, and Terence A. S. Matalon, published *American Roentgen Ray Society* 154:847–848, Apr. 1990,0361–803X90/1544–0847.
Article entitled: "CT Body Stereotaxic Instrument for Percutaneous Biopsy and Other Interventive Procedures" by: Gary Onik, M.D., Eric R. Cosman, PhD., Trent Wells, Jr., Alert A. Moss, M.D., Henry I. Goldberg, M.D., and Philip Costello, M.D. by *Investigative Radiology* Aug. 1985.
Article entitled: "Development and Use of Realistically Shaped Tissue Equivalent Phantoms for Assessing the Mammographic Process" by Panos P. Fatouros, PhD, William F. Conway, M.D., PhD, Curtis W. Hayes, M.D., Stanley E. Skubic, PhD., published *Radiological Society of North America* Nov.–Dec. 1988.
CIRS, Inc. sales literature entitled "Tissue Equivalent Breast Phantoms", published 1990 Catalog.
Abstract: Title: Percutaneous Stereotactic Brain Tumor Biopsy and Cyst Aspiration with a non–invasive Frame. Article on order.
Abstract: Title: Clinical application of CT Stereotactic device in biopsy of brain lesions. Article on order.
Article entitled: "Stereotactic suboccipital transcerebellar biopsy under local anesthesia using the Cosman–Roberts–Wells frame". by Roberto Spiegelmann, M.D., and William A. Friedman, M.D. published *J. Neurosurg.* vol. 75, Sep. 1991, p. 486–488.
Technical Note: "A Guidance Device for CT–guided Procedures", by George D. Reyes, M.D., published *Radiology* Sep. 1990 vol. 176, No. 3, p. 863–868.
Technical Note: "CT Body Stereotaxic System for Placement of Needle Arrays". published I. J. Radiation Oncology, Biology, Physics vol. 13, pp. 121–128 by Gary Onik, M.D., Eric Cossman, PhD, Trent Wells, Harry I Goldberg, M.D., Albert Moss, M.D., Robert Kane, M.D., Shiella Moore, M.D., Paul Stauffer, Phillip Costello, M.D., and William Hoddick, M.D.
Article entitled: Castaneda–Zuniga W R: Interventional radiology: Yesterday, today, tomorrow. In Castaneda–Zuniga W R and Tradavarthy S M (eds): *Interventional radiology*. Baltimore, Williams & Wilkins, 1988.
Article entitled: "Anthropomorphic Phantoms Bridge the Gap" published *Radiology/Nuclear Medicine International* 1981 by J. G. Pearce, M.B.Ch.B., M.S.R.R., D.A.B.R.
Article entitled: "The Phantom Patient, for comprehensive basic training of Radiologic Technologists" published *Alderson Research Laboratories, Inc.*, 1979–1980.
Catalog Jan. 1992 Sawbones.
Factory Price List, Medical Plastics Laboratory Professional Health Educators, Sep. 1986.

*Primary Examiner*—Nicholas D. Lucchesi

[57] ABSTRACT

A phantom for use in training persons in locating and aspirating tumors identified by X-ray in a human body part consists of a body of a tissue equivalent X-ray permeable material containing at least one aspiratable simulated tumor suspended in the interior of the body. A method of making the phantom also is disclosed.

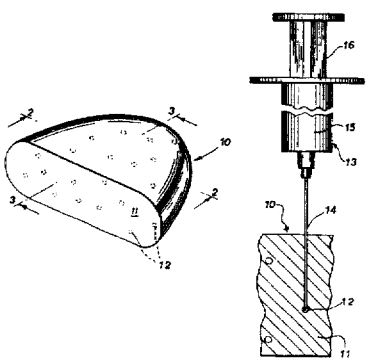

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 3-8 is confirmed.

Claims 1 and 2 are cancelled.

\* \* \* \* \*